Nov. 22, 1966
H. C. EANES
3,286,441
BOOT FOR WALKING HORSE
Filed June 16, 1965
2 Sheets-Sheet 2
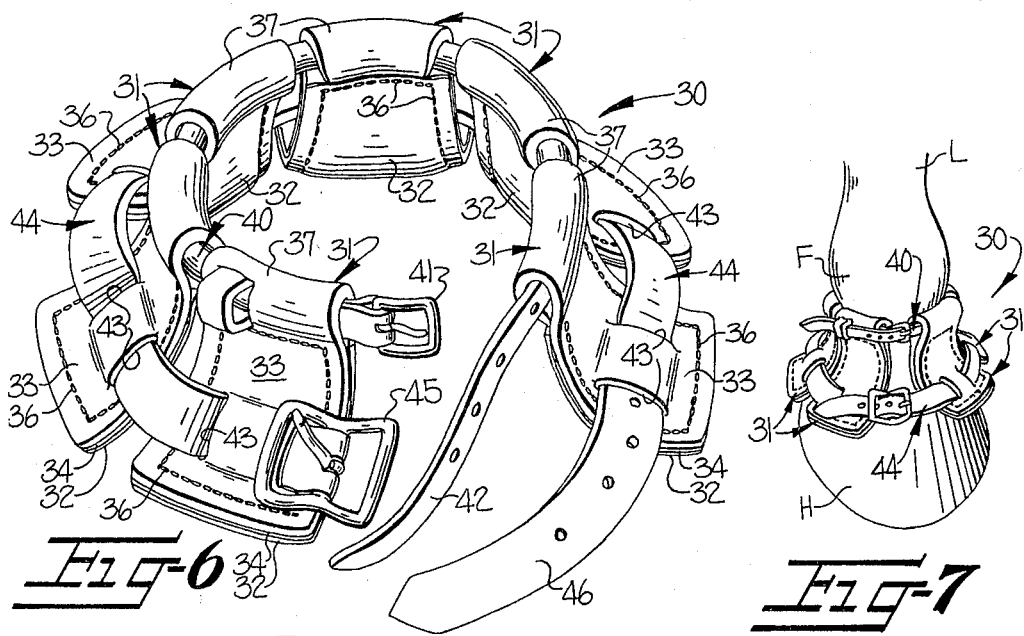
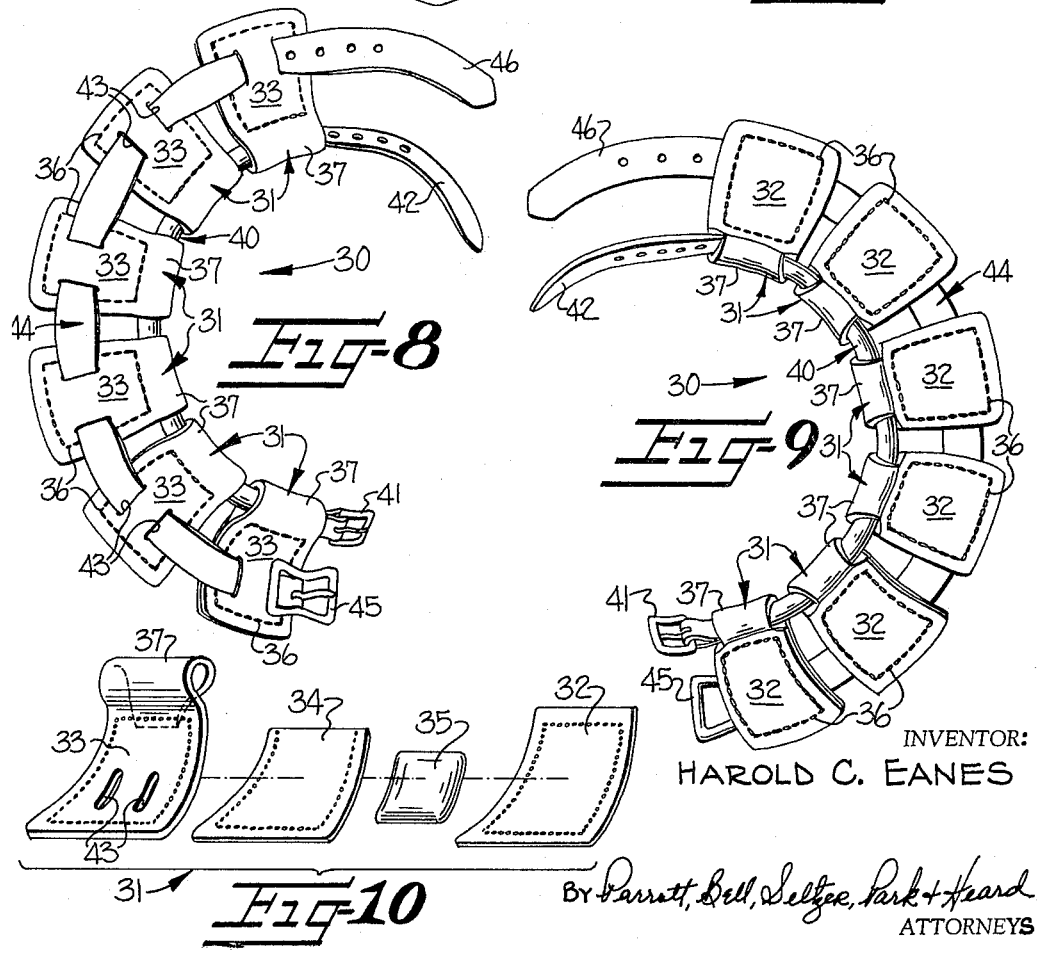
INVENTOR:
HAROLD C. EANES
By Barrett, Bell, Seltzer, Park + Heard
ATTORNEYS

United States Patent Office 3,286,441
Patented Nov. 22, 1966

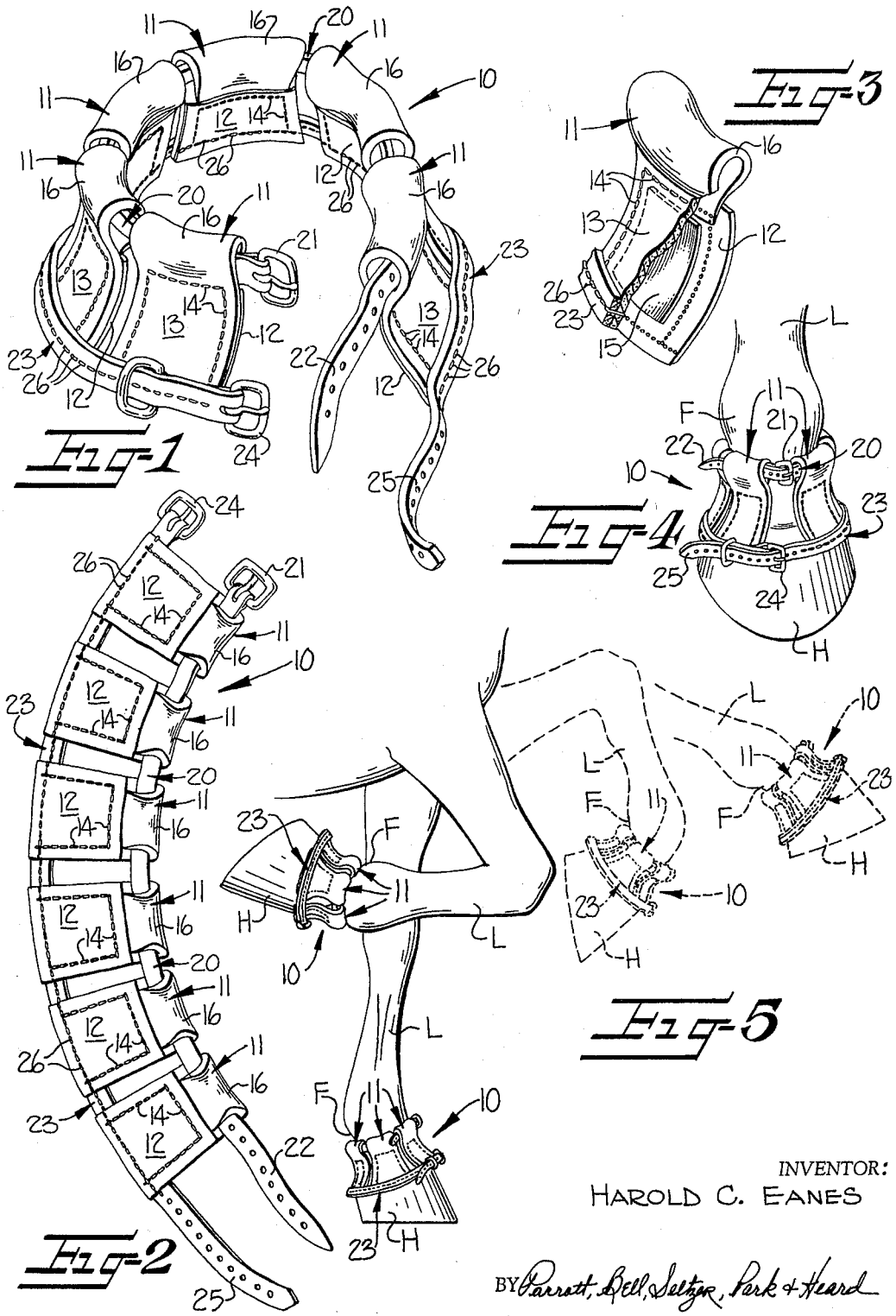

3,286,441
BOOT FOR WALKING HORSE
Harold C. Eanes, % Eanes Manufacturing Company,
Stoneville, N.C.
Filed June 16, 1965, Ser. No. 464,350
7 Claims. (Cl. 54—82)

My invention pertains to a boot for a horse, and more particularly to such a boot useful in training a special gaited horse, such as a walking horse, to lift its front legs with an action preferred for purposes of show.

In showing certain special gaited horses and particularly the type known as walking horses, it is desirable that the horse being shown move with a front leg action in which the movements of the legs are somewhat accentuated, as by the horse raising the legs higher than would be normal with an untrained horse. In order to obtain this preferred front leg action, some trainers of such special gaited horses have in the past resorted to various inhumane practices, such as chemically or mechanically injuring the legs or hooves of the horse to make the same tender and thus cause the horse to lift his legs higher due to pain. An alternative to direct and immediate injury has been the use of chains secured about the leg of a horse intermediate the fetlock and coronet of the leg in the pastern area. The frictional engagement of the chain with this tender area of the leg of a horse leads the horse to raise the leg higher with increased action in an attempt to throw the chain from the leg. Where chains are used in this manner, eventual injury to the leg of the horse will necessarily occur. Such inhumane practices as direct chemical or mechanical injury or the use of chains with resultant eventual injury have been banned by the American Horse Show Association and the Tennessee Walking Horse Trainers and Breeders Association, for obvious reasons, and horses injured as a result of such inhumane training practices may no longer be shown.

Prior to, and especially since, the banning of previously used inhumane methods for training of walking horses, a suitable humane training method or apparatus for achieving the desired front leg action has been widely sought. Various devices and boots, designed for attachment to the leg of a horse and for frictional engagement with the tender areas of the leg, have been developed and widely used. However, from the use of such conventional boots, it has become apparent that such boots suffer from various deficiencies.

First, many conventional boots, when placed in position encircling the pastern portion of the leg of a horse, have the ends of the boot lapped over one another in order to obtain closure for the boot, or positioning of the boot about the pastern. With such a lapped construction, the inwardly exposed end of the boot frequently has a greater frictional action on the pastern than the other portions of the boot, and tends to overly irritate the leg at one particular point. This excessive frictional rubbing at one point may easily injure the horse and further causes the horse to quickly develop a front leg action known as winging, in which the horse does not move the front legs in a straight line, as is preferred. Secondly, the somewhat rigid nature of such conventional boots causes the same to frictionally engage the pastern portion only at a few points. As a result, the frictional engagement of the pastern will not be the same for both front legs of the horse, and unbalanced action will result in which the horse does not lift both front legs to the same extent or has a greater forward movement action with one leg than the other.

Thirdly, with many conventional boots an attempt is made to enhance the frictional action on the leg in order to develop the desired action in horses which do not readily respond to the use of a boot, as by weighting the boot. Any such attempt at increasing the frictional action substantially increases the likelihood of injury, particularly as no more uniform frictional engagement with the leg is obtained than with a conventional unweighted boot. Accordingly, such boots are either ineffective to obtain the desired action or cause such injury as to be disapproved by show associations.

It is, therefore, an object of this invention to obviate the aforementioned deficiencies of conventional boots for horses by providing a novel boot adapted to apply more uniform frictional engagement to the pastern portion of the leg of a horse with substantially no likelihood of injury to the horse.

A more specific object of this invention is to provide a boot for horses in which a plurality of independent segment members collectively define a truncated generally conical boot encircling the pastern portion of the leg of a horse and more uniformly engaging the pastern than has been true of conventional boots.

A further specific object of this invention is to provide a boot of the type described having a roughened interior convex surface adapted to be positioned for uniform frictional engagement with the pastern and effective to increase the frictional action with the leg without increasing the likelihood of injury.

Some of the objects of the invention having been stated, other objects will appear as the description proceeds when taken in connection with the accompanying drawings, in which—

FIGURE 1 is a perspective view of the boot of this invention as prepared for positioning about the pastern portion of the leg of a horse;

FIGURE 2 is a top plan of the boot of FIGURE 1 opened out to lie substantially in a single plane;

FIGURE 3 is a detailed perspective view of one segment member of the boot of FIGURE 1, partly broken away to reveal the construction of the segment member;

FIGURE 4 is a perspective view of the boot of FIGURE 1 as positioned encircling the pastern portion of the leg of a horse;

FIGURE 5 is a side view of the leg of a horse as shown in FIGURE 4, indicating the various positions of the leg during the desired movement of the horse;

FIGURE 6 is a perspective view of a modified form of the boot of this invention as prepared for positioning about the pastern portion of the leg of a horse;

FIGURE 7 is a view of the boot of FIGURE 6 as positioned encircling the pastern portion of the leg of a horse;

FIGURE 8 is a top plan of the boot of FIGURE 6 opened out to lie substantially in a single plane;

FIGURE 9 is a bottom plan of the boot of FIGURE 8; and

FIGURE 10 is an exploded view of one segment member of the boot of FIGURE 6.

Referring now more particularly to the drawings, the boot of the present invention, indicated generally at 10, comprises a plurality of independent segment members 11 which collectively define a truncated generally conical boot adapted to be removably positioned encircling the pastern portion of the leg of a horse. The particular construction and configuration of each individual segment 11 may be best brought out by discussion with reference to FIGURES 1 and 3. In the latter figure, it may be seen that each independent segment member 11 is formed by an inner member 12 and an outer member 13, secured together by suitable means such as stitching 14. Preferably, the inner and outer members 12 and 13 are formed of leather, for reasons of economy, ease of workability, and durability of the boot. However, other materials may be used if considered desirable, such as heavy fabrics or plastic, and means other than stitching may be employed where considered practical and economical for the alternate materials chosen. Each individual segment member 11 has an inwardly curved configuration, corresponding substantially to the configuration of the surface to be engaged in the pastern portion of the leg of a horse.

In order to obtain the desired configuration for an individual segment member, and to maintain the same during use of the boot, each segment member preferably includes a stay means in the form of a suitably shaped rigid member 15 positioned between the inner member 12 and the outer member 13 and held in place by stitching. Where only rigidity is required, the stay means may be formed of any suitable material, such as spring steel or plastic. Further, where a naturally more rigid material, such as some plastics, is chosen which does not have the flexibility in use of leather, stays may not be necessary to maintain the segment members in their required configuration. In certain circumstances, where an individual trainer feels that the action of an individual horse's front legs may be improved by using a weighted boot, the rigid member 15 may be formed of a suitable heavier formable material, such as sheet lead.

The interrelation of the plurality of independent segment members 11 to form the boot 10 of this invention is most clearly brought out in FIGURES 1 and 2. In those figures, the boot 10 is shown to include means connecting the independent segment members 11 at the upper portions thereof and means connecting the segment members 11 at the lower portions thereof, with both means adapted to removably encircle the pastern portion of the leg of a horse to maintain the boot in operative position and the individual segment members each in frictional engagement with the pastern portion.

In order to permit an adjustment of the effective diameter of the upper end of the boot 10, as positioned encircling the pastern, the means positioned at the upper portion of the independent segment members 11 passes through loop portions 16 of those segment members 11, which, as illustrated, are formed by folding over an upper portion of the outer member 13. A strap means 20, including suitable clasp means such as a buckle 21 and a perforated free end portion 22, is threaded through the loop portions 16 to slidably connect the segment members 11.

The means for connecting the segment members at the lower portions thereof is preferably a lower strap means 23 having suitable clasp means such as a buckle 24 and a perforated free end portion 25, and being secured to the segment members 11 adjacent the lower extremity thereof by stitching 26. The securement of the segment members 11 and strap means 23 by stitching 26 is such as to maintain the segment members 11 in a predetermined spaced apart relation, as best shown in FIGURE 2, which spaced apart relation is maintained on positioning the boot to encircle the pastern portion of the leg of a horse. While the lower strap means 23 is preferred, other means may be provided for connecting the independent segment members and maintaining the same in a predetermined spaced apart relation, such as individual legs provided on each independent segment member or links of some character extending between immediately adjacent pairs of segment members 11. Further, while lower strap means 23 preferably is positioned adjacent the lower extremities of the segment members 11, experimentation has revealed that some individual horses will respond more readily to the use of the boot of the present invention when the strap means 23 encircles the segment members at a height above their lower extremities, but within the lower half thereof. Accordingly, such a positioning of the lower strap means 23 or other functionally similar means is comprehended by the present invention.

Where leather is used for the inner member 12, the interior surface which is to be positioned engaging the leg of the horse may be given special finishes appropriate to the degree of frictional action required for an individual horse. For a horse which readily responds to the use of a boot, the inner member 12 may be given a smoothly polished or slick surface. For a horse which does not readily respond, the inner member 12 may be positioned with a relatively roughened or unfinished surface of the leather as the interior convex surface in order to increase frictional action on the leg. Inasmuch as leather is naturally somewhat resilient, this may be done without raising the danger of injury to the horse.

The boot 10 of the invention is shown in operative position encircling the pastern portion of the leg of a horse in FIGURES 4 and 5. There, the strap means 20 is shown removably encircling the leg L in the pastern portion immediately below the fetlock F. The strap means 23 removably encircles the leg L immediately adjacent to the coronet portion of the hoof H. Together, the upper strap means 20 and the lower strap means 23 maintain the boot in operative position encircling the leg L of the horse and position the segment members 11 with the convex interior surface provided by the inner member 12 in frictional engagement with the pastern. Due to the construction of the boot of this invention with a plurality of independent segment members, each being inwardly curved, all segments of the boot are in frictional engagement with the pastern when the boot is properly positioned encircling the pastern portion. Thus, the areas of frictional engagement extend entirely around the pastern, preventing unbalance and resulting defects in the stride of the horse, as would be true with a conventional boot. This is true regardless of the position of the leg, either in contact with the ground, raised during the first portion of the movement of the leg in taking a step, or extended, as indicated in FIGURE 5. Further, the evenly distributed frictional engagement entirely around the pastern portion of the leg results in causing the horse to lift the leg high both when initially raised and when reaching to complete a step, as also indicated in FIGURE 5.

In order to accommodate a wide range of hoof sizes in horses to which a boot is to be applied, a modified form of boot 30 of the present invention is contemplated, as illustrated in FIGURES 6–10. In similarity to the boot 10 shown in FIGURES 1–5, the boot 30 includes a plurality of individual and independent segment members 31, which collectively define a truncated generally conical boot 30 for encircling the pastern portion of the leg of a horse, and each of which has an inwardly curved configuration to define a convex interior surface which is preferably roughened. Each individual segment member 31 is formed by a plurality of elements, including an inner member 32, an outer member 33, and an intermediate member 34, and preferably a stay means 35 (FIGURE 10), which are secured together by suitable means, such as stitching 36 (FIGURE 6).

In similarity to the segment member 11, the upper portion of the outer member 33 is folded or turned over to form a loop portion 37 for each segment member 31. A strap means 40 is threaded through the loop portions 37 to slidably connect the segment members 31 at their upper extremities and this strap means includes a clasp means, such as a buckle 41 and a perforated free end portion 42.

Each of the segment members 31 has a pair of spaced apart, vertically disposed slots 43 in the lower portion of outer member 33 thereof, and a lower strap means 44, including a clasp means, such as a buckle 45 and a perforated free end portion 46, is threaded through the slots 43 in the outer member 33 of each segment member 31 to slidably connect the segment members at the lower portions thereof. The lower strap means 44 and the slots 43 are so sized as to provide tight frictional engagement of the segment members 31 with the lower strap means 44 as the strap means is threaded through the slots 43 and passing between the outer member 33 and the intermediate member 34. Accordingly, in contrast to the segment members of boot 10, the segment members 31 of boot 30 are adjustably connected at the lower portions to permit the diameter of the lower portion of the boot to be varied as the boot is positioned encircling the pastern portion of the leg of the horse (FIGURE 10).

Accordingly, it is considered that a novel boot for horses has been disclosed which avoids the deficiencies of conventional boots by obtaining evenly distributed frictional engagement with the pastern portion of the leg of a horse, to prevent winging or unbalanced action in the movement of the horse's legs.

More particularly, the boot as herein disclosed has a plurality of independent segment members which collectively define a truncated generally conical boot, and each segment member may have a roughened interior convex surface for effective frictional contact with the leg of a horse without increased danger of injury.

In the drawings and specification there have been set forth preferred embodiments of the invention and, although specific terms are employed, they are used in a generic and descriptive sense only and not for purposes of limitation, the scope of the invention being defined in the claims.

I claim:

1. A boot for use in obtaining the desired front leg action in certain special gaited horses, such as a walking horse, comprising:
a plurality of independent segment members adapted to collectively define a truncated generally conical boot for encircling the pastern portion of the leg of a horse, each of said segment members being inwardly curved and having an interior convex surface for frictional engagement with the pastern,
strap means slidably connected to said segment members at the upper portion thereof for adjusting the effective diameter of the upper end of the boot and adapted to removably encircle the pastern immediately below the fetlock portion of the leg for maintaining the boot in operative position and said segment members in frictional engagement with the pastern, and
means connecting said segment members at the lower portions thereof and adapted to removably encircle the leg adjacent the upper extremity of the hoof portion for aiding in maintaining the boot in operative position and said segment members in frictional engagement with the pastern.

2. A boot for use in obtaining the desired front leg action in certain special gaited horses, such as a walking horse, comprising:
a plurality of independent segment members adapted to collectively define a truncated generally conical boot for encircling the pastern portion of the leg of a horse, each of said segment members being inwardly curved and having an interior convex surface for frictional engagement with the pastern and having the upper extremity of said segment member folded to form a loop portion,
strap means threaded through said loop portion and slidably connecting said segment members at the upper extremities thereof and adapted to removably encircle the pastern immediately below the fetlock portion of the leg for maintaining the boot in operative position and said segment members in frictional engagement with the pastern and for adjusting the effective diameter of the upper end of the boot, and,
strap means connecting said segment members at the lower portions thereof and adapted to removably encircle the leg immediately adjacent the coronet portion for aiding in maintaining the boot in operative position and said segment members in frictional engagement with the pastern.

3. A boot as claimed in claim 2 further comprising:
stay means within each of said segment members for maintaining the same inwardly curved with said convex surface properly disposed for frictional engagement with the pastern.

4. A boot as claimed in claim 2 further comprising:
weighted stay means within each of said segment members for maintaining the same inwardly curved with said convex surface properly disposed for frictional engagement with the pastern and for increasing this frictional engagement with the pastern.

5. A boot for use in obtaining the desired front leg action in certain special gaited horses, such as a walking horse, comprising:
a plurality of independent segment members adapted to collectively define a truncated generally conical boot for encircling the pastern portion of the leg of a horse, each of said segment members including stitched together outer and inner members, with at least the latter member being inwardly curved and having a roughened interior convex surface for frictional engagement with the pastern and with said outer member having the upper extremity thereof folded to form a loop portion,
stay means within each of said segment members for maintaining at least the inner member thereof inwardly curved with said convex surface properly disposed for frictional engagement with the pastern,
strap means including clasp means and being threaded through said loop portions and slidably connecting said segment members at the upper extremities thereof and adapted to removably encircle the pastern immediately below the fetlock portion of the leg for maintaining the boot in operative position and said roughened convex surfaces in uniform frictional engagement with the pastern and for adjusting the effective diameter of the upper end of the boot, and
strap means including clasp means and being stitched to and connecting said segment members at the lower extremities thereof and adapted to removably encircle the leg immediately adjacent the coronet portion for maintaining said segment members in predetermined spaced apart relation and for aiding in maintaining the boot in operative position and said roughened convex surfaces in uniform frictional engagement with the pastern.

6. A boot for use in obtaining the desired front leg action in certain special gaited horses, such as a walking horse, comprising:
a plurality of independent segment members adapted to collectively define a truncated generally conical boot for encircling the pastern portion of the leg of a horse, each of said segment members being inwardly curved and having an interior convex surface for frictional engagement with the pastern and having the upper extremities of said segment member folded to form a loop portion,
strap means threaded through said loop portions and slidably connecting said segment members at the upper extremities thereof and adapted to removably encircle the pastern immediately below the fetlock portion of the leg for maintaining the boot in operative position and said segment members in frictional engagement with the pastern and for adjusting the effective diameter of the upper end of the boot, and
strap means slidably connecting said segment members at the lower portions thereof and adapted to removably encircle the leg immediately adjacent the coronet portion for aiding in maintaining the boot in operative position and said segment members in frictional engagement with the pastern and for adjusting the effective diameter of the lower end of the boot.

7. A boot for use in obtaining the desired front leg action in certain special gaited horses, such as a walking horse, comprising:

a plurality of independent segment members adapted to collectively define a truncated generally conical boot for encircling the pastern portion of the leg of a horse, each of said segment members including stitched together outer and inner members, with at least the latter member being inwardly curved and having a roughened interior convex surface for frictional engagement with the pastern and with the outer member having spaced apart vertically disposed slots therein and the upper extremity thereof folded to form a loop portion, stay means within each of said segment members for maintaining the same inwardly curved with said convex surface properly disposed for frictional engagement with the pastern, strap means including clasp means and being threaded through said loop portions and slidably connecting said segment members at the upper extremities thereof and adapted to removably encircle the pastern immediately below the fetlock portion of the leg for maintaining the boot in operative position and said roughened convex surfaces in uniform frictional engagement with the pastern and for adjusting the effective diameter of the upper end of the boot, and strap means including clasp means and being threaded through said slots to connect said segment members at the lower portions thereof and being adapted to removably encircle the leg immediately adjacent the coronet portion for maintaining said segment members in adjustable predetermined spaced apart relation and for aiding in maintaining the boot in operative position and said roughened convex surfaces in uniform frictional engagement with the pastern.

References Cited by the Examiner

UNITED STATES PATENTS

| | | |
|---|---|---|
| 484,820 | 10/1892 | Rahn. |
| 591,510 | 10/1897 | Thurlow _____ 54—82 |
| 1,036,750 | 8/1912 | Tuttle _____ 54—82 |
| 3,124,919 | 3/1964 | Thompson _____ 54—82 |

FOREIGN PATENTS 5,710   11/1901   Austria.

SAMUEL KOREN, *Primary Examiner.*

HUGH R. CHAMBLEE, *Examiner.*